United States Patent [19]

Abrams et al.

[11] 4,173,491

[45] Nov. 6, 1979

[54] PIGMENTED MICROPOROUS SILICA MICROSPHERES BY SPRAY PROCESSES

[75] Inventors: Lloyd Abrams, Hockessin; Lionel S. Sandell, Wilmington, both of Del.

[73] Assignee: E. I. Du Pont de Nemours and Company, Wilmington, Del.

[21] Appl. No.: 882,984

[22] Filed: Mar. 3, 1978

[51] Int. Cl.$^2$ ................................................ C09C 1/28
[52] U.S. Cl. ............................ 106/288 B; 106/308 B; 106/309
[58] Field of Search ................. 106/288 B, 308 B, 309

[56] References Cited

U.S. PATENT DOCUMENTS 3,418,147  12/1968  Fields .............................. 106/308 B

*Primary Examiner*—James E. Poer

[57] ABSTRACT

Process for preparing pigmented microporous silica microspheres by spraying an aqueous suspension of pigment in a solution of alkali metal silicate through the air into a medium consisting of from 20% to 100% by volume of a water miscible organic liquid, the balance being water. The resulting microspheres are highly effective opacifying agents.

4 Claims, No Drawings

PIGMENTED MICROPOROUS SILICA MICROSPHERES BY SPRAY PROCESSES

DESCRIPTION

1. Technical Field

The invention is directed to the preparation of pigmented microporous silica microspheres, useful as opacifying agents, and particularly to their preparation via a spray process which eliminates the need for water immiscible organic liquids in processing and minimizes process steps.

2. Background Art

Historically silica microspheres having a microporous structure or gel structure have been utilized as catalyst supports in a variety of applications. However, gel pores are too small to effectively scatter light and therefore render the microspheres useless for pigmentary applications. One process for preparing silica beads containing dispersed fines for use as catalysts, described in U.S. Pat. No. 3,520,828, entails spraying an acidified silica hydrosol into the air where they gel in air suspension. This process produces particles which are very coarse and much too large for pigmentary applications, e.g., from 300–4000$\mu$.

Smaller silica particles have been prepared by pouring an alkali metal silicate solution into a water miscible organic alcohol or ketone to form a suspension of dehydrated silica particles, which are neutralized to gel, as described in U.S. Pat. No. 2,386,337. However, this process produces particles having no pigment dispersed therein and are, consequently, not effective as opacifying agents. A somewhat similar process, described in U.S. Pat. No. 2,948,701, involves mixing a solution of sodium silicate with a water miscible organic coacervating compound, e.g., alcohol, cyclic ether, to form a colloidal silicate suspension. The silicate is then insolubilized by adding a water soluble metal salt, oxide or hydroxide which reacts with the silicate to form an insoluble metal silicate. While these silicate particles are useful as extender pigments, they are not useful per se as highly effective opacifying agents.

Silica microspheres useful as opacifying agents have been prepared by a double emulsion technique as described in U.S. Pat. No. 4,011,096 whereby a water immiscible organic liquid is dispersed in a siliceous aqueous phase which is in turn dispersed in a second water immiscible organic liquid. The siliceous aqueous phase is then gelled to form microporous silica microspheres containing vesicles within each microsphere which enhance the opacity of the microsphere. To achieve optimum opacity a particulate inorganic pigment is incorporated in the siliceous aqueous phase.

Another method for preparing pigmented microporous silica microspheres, described in copending application Ser. No. 635,060, now U.S. Pat. No. 4,090,887, involves a single emulsion technique whereby a siliceous aqueous phase containing particulate inorganic pigment is dispersed in a water immiscible organic liquid, after which the dispersed droplets are gelled. The resulting microspheres contain no vesicles, as do those prepared by the double emulsion technique, but do contain particulate inorganic pigment uniformly distributed throughout the microporous silica microsphere. The micropores enhance the light scattering power of the particulate inorganic pigment in the microsphere by lowering the average refractive index of the surrounding silica matrix to a value between that of silica and air.

Although the above-described emulsion process produces very high quality opacifying pigment, these processes require the use of water immiscible organic liquids and surfactants, and numerous processing steps which render these processes commercially unattractive from the standpoint of convenience and economics.

DISCLOSURE OF THE INVENTION

This invention provides a process for producing pigmented microporous silica microspheres which offers the simplicity of a spray operation and single phase reaction medium while providing microspheres of the general type and quality produced by the emulsion processes.

According to this invention there is provided a process for preparing pigmented micrporous silica microspheres by the steps of (i) forming an aqueous suspension consisting essentially of particulate inorganic pigment uniformly dispersed in an aqueous solution of an alkali metal silicate.

(ii) spraying the aqueous suspension of step (i) into air to form fine droplets, (iii) contacting the droplets with a medium consisting essentially of from 0% to 80% by volume of water, based on the volume of the medium, and from 20% to 100% by volume of a water miscible organic liquid, based on the volume of the medium, the pH of the medium being maintained at from 2 to 9 throughout the contacting, to form a suspension of pigmented microporous silica microspheres, and (iv) isolating the microporous silica microspheres from the suspension of step (iii).

To insure the preparation of an optimum opacifying agent it is preferred that the aqueous suspension of step (i) contain from 10% to 70% by weight of a particulate inorganic pigment, based on the weight of the total solids in the aqueous suspension. The amount of water miscible organic liquid in the medium of step (iii) should preferably be from 20% to 60% by volume. Lower aliphatic alcohols are preferred for reasons of availability and economics. It is further preferred that the pH of the medium of step (iii) be maintained from 2 to 5 throughout the contacting.

The aqueous suspension utilized in the practice of the invention can be conveniently prepared by dispersing a particulate inorganic pigment in an aqueous solution of an alkali metal silicate using any common mixing technique. Because the temperature of the aqueous suspension is not critical to the practice of the invention, ambient temperature is preferred.

The aqueous solution can contain any alkali metal silicate, sodium silicate being preferred for availability and economy. It is preferred that the aqueous solution contain from 20% to 36% by weight of silica, calculated as $SiO_2$ and based on the total weight of the aqueous solution. For example, a sodium silicate useful in the practice of the invention usually has a $SiO_2:Na_2O$ weight ratio between 2:1 and 4:1. A commonly commercially available sodium silicate, having a $SiO_2:Na_2O$ weight ratio of 3.25:1 is sold in the form of an aqueous solution containing 30% by weight of silica. To prevent possible clogging of the nozzles through which this solution will be sprayed, it is recommended that the 30% by weight solution be diluted with 0.1 to 0.5 equivalent volumes of water prior to use.

The inorganic pigment used to form the aqueous suspension should preferably have a refractive index of at least 1.6 to insure optimum opacity in the final microspheres and be pigmentary in nature, i.e., preferably have a particle size from 0.1 μm to 0.5 μm. Typical inorganic pigments having the requisite properties include titanium dioxide, clay, calcium carbonate, white lead, zinc oxide, zinc sulfide, and carbon black. Anatase or rutile titanium dioxide are especially preferred.

The aqueous suspension described above can then be transported to any conventional spraying device via, for example, pumping or siphoning. The aqueous suspension is sprayed into the air in order to form fine droplets which are the precursors to the final microspheres. Preferred spray nozzles are of the external mix air atomizing type in which both air and liquid are supplied under pressure. The liquid pressure is relatively low, a few psi, enough to feed the liquid to the nozzle. Siphon pressure is adequate. These nozzles provide a high degree of atomization to the spray and are capable of producing the small droplet sizes needed for the microsphere precursors at air pressure of 10–100 psig [69–690 kPa, gauge].

High pressure airless spray nozzles are also suitable for forming the droplet precursors. This type of nozzle does not require compressed air to shear the aqueous suspension into droplets. Instead the aqueous suspension is atomized by forcing it through a small orifice tip at high pressure. Liquid pressures of 1000–2000 psig [6895–13790 kPa, gauge] are typical. Such nozzles generally do not produce as fine a spray as the air atomizing type, but their output is substantially greater, making them more suitable for a large scale manufacturing process.

The medium which the droplets contact preferably contains from 20% to 60% by volume of a water-miscible organic liquid, the balance being water. Methanol is preferred. Other water miscible organic liquids which are suitable include the lower aliphatic alcohols, acids, ketones, glycols, glycol ethers, alcohol amines, amines, etc., e.g., ethanol, isopropanol, tert-butyl alcohol, acetic acid, propionic acid, acetone, ethylene glycol, propylene glycol, diethylene glycol monomethyl ether, glycerol, triethanolamine, etc.

No microspheres will be produced if the concentration of the organic liquid in the medium is less than about 20% by volume initially. In this case the spray droplets simply dissolve in the bath liquid because there is insufficient alcohol to dehydrate the silicate component of the droplets and reaction with the acid which is added would eventually lead to a homogeneous silica gel forming throughout the bath over a period of several minutes or even hours, depending on the silicate concentration in the bath solution. The rate of silica gel formation increases when salts are added to the bath.

The spray droplets will harden via dehydration substantially immediately upon contacting the medium prepared according to the invention. Because the pH of the medium will increase from the added alkali content, the pH of the medium is held constant during spraying and subsequent contact by simultaneously adding acid to the medium. The pH is maintained in the range of 2–9, preferably from pH 2–5 and most preferably from pH 2–4. Mineral acids such as hydrochloric, sulfuric and nitric are preferred.

The medium should preferably be stirred slowly throughout the contacting to maintain a homogeneous chemical composition while acidifying and to remove freshly hardened microspheres from the surface of the medium. Rapid stirring with a strong vortex is undesirable since the shearing action tends to distort the spray droplets before they can dehydrate completely and set. Thus, the appearance of tear-shaped or fibrous particles in the final product indicates that bath agitation was too intense. Once the pigmented microspheres are formed, the pH of the medium is adjusted to 4–7 and the microspheres are recovered by filtration, decantation or centrifugation. They are then washed thoroughly to remove residual organic liquid and salts. The final product can be dried or concentrated to a wetcake.

The microporous pigmented silica microspheres prepared according to the invention are in the form of spheroidal, discrete particles having a substantially smooth continuous surface. Diameters of the microspheres may range from 2 μm to 100 μm but are preferably less than 25 μm for use in paints and less than 50 μm when incorporated in paper. The microspheres are not solid but contain gel-type microspores having average diameters between 0.002–0.05 μm. Depending on process conditions, the microspheres may also contain vesicles having an average diameter of 0.1–10 μm. The total volume of the micropores and vesicles ranges from 10–60% of the total microsphere volume. The microspheres contain from 10–70% by weight of a high refractive index inorganic pigment.

The most important process parameter controlling the amount and nature of the porosity in the microspheres is the concentration of organic liquid in the bath. In the case where the organic liquid was methanol, the following trends were observed when the initial methanol concentration in the medium was varied from 75% by volume down to 35% by volume:

The surface area of the microspheres decreased. The total porosity and average micropore diameter increased. The pore volume distribution curve became wider. In all cases, the porosity is primarily microporous, i.e., gel type pores in the 0.002–0.05 μm size range.

Electron microscopic studies of these microspheres revealed an unexpected and beneficial effect of lower bath alcohol concentrations on gel morphology. Microspheres made in 35% by volume of methanol contained discrete, completely enclosed vesicles of about 0.1–1.0 μm in diameter. The vesicles were less evident in the products prepared using 50% by volume of methanol and nonexistent in the products prepared using 75% by volume of methanol. Such vesicles are in the size range which is effective for light scattering and therefore can improve the opacifying performance of pigmented microspheres. While this invention is not bound by any theory, we hypothesize that the vesicles are created when air is engulfed by the silicate stream as it emerges from the nozzle in a high-shear field. Essentially, a double emulsion of air/silicate/air is formed. The stability of the internal air voids is probably governed by the solubility of air in the methanol bath. Air is about ten times more soluble in methanol than in water, consequently the air voids would be less stable at higher alcohol concentrations and would tend to dissolve in the bath before the silicate sets up by dehydration.

Pigmented silica microspheres prepared according to the invention are useful as opacifying agents for coating compositions such as latex paints. Although the gel pores are themselves too small to effectively scatter light (void scattering), they enhance the light scattering power of the particulate inorganic pigment in the microsphere by lowering the average refractive index of the surrounding silica matrix to some value intermediate between that of silica and air. Inorganic pigment incorporated in this porous matrix thus has greater light scattering efficiency than the same pigment imbedded in a non-porous composition of the same refractive index as silica.

Although the microspheres are useful as opacifiers for coatings made with a solution vehicle, they perform most effectively when nonvolatile components of the vehicle do not penetrate the micropore structure. Such is the case with latex paints; the gel pores are too small to be penetrated by the latex particles. In a conventional latex paint the pigment volume concentration (PVC) is high enough to cause severe crowding of the pigment particles in the dry film, resulting in a significant loss in pigment scattering efficiency. Such crowding effects are reduced when pigmented silica microspheres are used to opacify latex paints. The pigment, being uniformly distributed and fixed inside the gel matrix, loses no scattering efficiency due to crowding at high microsphere loadings in the paint.

The microspheres prepared according to the invention are also useful as a flatting agent for paints, particularly in the size range above 5 $\mu$m. These microspheres should also be useful as a filler pigment for fibrous substrates such as paper. Normally, fillers such as TiO$_2$, clay, calcium carbonate, etc. are added to a paper finish prior to formation of the fibrous web on a papermaking machine. Since the filler particles are small (usually less than 1 micron) it is difficult to retain them in the web and a substantial fraction ends up in the whitewater. Pigmented silica microspheres added to the furnish should have higher retention than ordinary fillers because of their large size, thereby increasing the efficiency of the paper-making operation.

BEST MODE—EXAMPLES

The following examples serve to illustrate the invention.

EXAMPLE 1

This example illustrates the preparation of pigmented microporous silica microspheres in a medium consisting of 35% by volume of methanol and 65% by volume of water using air-atomizing spray nozzles.

A spraying apparatus was constructed consisting of a 13-liter plastic pail fitted at the bottom with a blender agitating assembly. The whole unit was attached to a speed controlled blender. The apparatus was also fitted with a pH electrode, acid addition funnel and two commercially available air-atomizing nozzles, sold by Spraying Systems Co. setup No. E15B, and were placed a few inches above the pail.

A solution of 1400 ml methanol and 2600 ml water was added to the pail and slowly stirred with the agitator. A slurry consisting of 500 ml of a 29% by weight solution of sodium silicate (SiO$_2$/Na$_2$O:3.25, Du Pont Technical Grade No. 9), 125 g of TiO$_2$ pigment sold by Du Pont under the name Ti-Pure R-100, and 125 ml water was siphoned to the nozzles and sprayed into the alcohol-water bath using 40 psig [276 kPa, gauge] air pressure. The pH of the bath was maintained at 3 throughout the run by simultaneously dripping in 10% sulfuric acid solution. Total spray time was about 35 minutes.

The microsphere slurry was adjusted to pH 6 and allowed to equilibrate at this pH for several hours. The microspheres were degritted through a 325 mesh screen and washed by repeated centrifugation in distilled water. The final washwater had a pH of 8.1 and a specific resistance of ca. 18000 $\Omega$-cm. A sample of the wetcake was dried at 110° C. and analyzed as follows:

Ash=96.4%; TiO$_2$=44.9% of ash; SiO$_2$=56.1% of ash. The dried product had a surface area of 118 m$^2$/g and a solids density of 2.50 g/cc. Examination of the pigment under a light microscope revealed opaque, spherical microspheres with smooth continuous surfaces. Their median diameter was 13.5 $\mu$m, measured with a Coulter Counter. From nitrogen adsorption data the porosity of the microspheres was estimated to be about 46% by volume, and the median gel pore diameter was 114 Å. Sections of the microspheres examined in the transmission electron microscope showed that the gel matrix also contained numerous discrete spherical vesicles ranging from 0.1–1.0 $\mu$m in diameter.

EXAMPLES 2-4

These examples illustrate the effect of the concentration of a water-miscible organic liquid in the bath on the morphology of the microporous gel matrix of pigmented silica microspheres.

EXAMPLE 2

Pigmented microporous silica microspheres were prepared as described in Example 1 except that the slurry consisted of 250 ml sodium silicate, 100 g of the titanium dioxide pigment and 35 ml water. One air atomizing nozzle was used, operating at an air pressure of 30 psig [207 kPa, gauge].

Analysis of the dried (80° C.) microspheres yielded:

Ash=92.4%; TiO$_2$=54.7% of ash; SiO$_2$=45.0% of ash. Scanning and transmission electron micrographs of the product showed fairly smooth surfaced microspheres containing a large number of discrete spherical vesicles inside the gel matrix. Additional properties are tabulated in Table I.

EXAMPLE 3

Pigmented microporous silica microspheres were prepared as described in Example 2, except that the initial composition of the bath solution was 2000 ml methanol and 2000 ml water.

Electron micrographs showed slightly "wrinkled" surfaces on the microspheres. Additional properties are given in Table I.

EXAMPLE 4

Pigmented silica microspheres were prepared as described in Example 2, except that the initial composition of the bath was 3000 ml methanol and 1000 ml water. Electron micrographs showed these microspheres to be partially collapsed and distorted. The median diameter of the microspheres was 15 $\mu$m. Additional properties are given in Table I.

TABLE I

| Example | Initial Methanol Concentration of Bath (Vol %) | Solids Density (g/cc) | Surface Area (m$^2$/g) | Microsphere Porosity (Vol %) | Median Gel Pore Diameter ($\mu$m) | 0.1-1um Vesicles Present in Gel Matrix |
|---|---|---|---|---|---|---|
| 2 | 35 | 2.75 | 89 | 45 | .0135 | numerous |
| 3 | 50 | 2.70 | 102 | 39 | .0091 | fewer than |

TABLE I-continued

| Example | Initial Methanol Concentration of Bath (Vol %) | Solids Density (g/cc) | Surface Area (m²/g) | Microsphere Porosity (Vol %) | Median Gel Pore Diameter (μm) | 0.1-1 μm Vesicles Present in Gel Matrix |
|---|---|---|---|---|---|---|
| 4 | 75 | 2.74 | 125 | 32 | .0054 | Ex. 2 virtually none |

EXAMPLE 5

This example illustrates the preparation of microspheres by spraying the aqueous suspension into an aqueous methanol bath held at pH 9.

The procedure of Example 1 was followed with the following exceptions:

An aqueous suspension containing 600 ml of the sodium silicate, 140 g of the TiO$_2$ pigment, and 120 ml water was sprayed at 30 psig [207 pKa, gauge] into a 35% methanol bath held at pH 9 by dripping in 20% hydrochloric acid. After spraying, the pH of the microsphere slurry was reduced to 6 and the beads were washed to a specific resistance of 20000 ω cm. and a pH of 8.7. The beads were given a final wash in n-propanol and dried in vacuum at 50° C.

Analysis of the dried microspheres yielded:

Ash=93.5%; SiO$_2$=60.1% of ash; TiO$_2$=39.1% of ash; surface area=316 m²/g; solids density=2.26 g/cc; nitrogen porosity=43 volume %.

EXAMPLE 6

This example illustrates a larger scale process for preparing pigmented microporous silica microspheres using high pressure, airless spraying.

A spray tank consisting of a 30-gallon plastic pail was filled with 12 liters of 50 volume % methanol. The bath was stirred slowly with a 6 inch paddle blade stirrer fitted to an air-drive motor. A feed slurry was prepared by blending 1500 ml of the sodium silicate described in Example 1, 370 g of the TiO$_2$ pigment described in Example 1 and 300 ml water. The slurry was sprayed into the bath using a pneumatic spray pump operating at a fluid pressure of 1380 psig [9515 kPa, gauge]. A tip having a 0.011 inch (0.279 mm) orifice was fitted to the pump nozzle which was located about 8 inches (20.3 cm) above the bath. Bath pH during the run was held at 3±1 by simultaneously adding concentrated hydrochloric acid. Total spray time was about three minutes, corresponding to a spray rate of about 0.14 gpm (0.53 liters/minute).

The product was degritted through a 325 mesh screen and the degritted material was recovered and washed to a specific resistance of about 8000 ω cm and a final pH of about 9. A sample of the degritted product was examined under a light microscope, which revealed uniformly opaque, spherical microspheres. Examination of imbedded and sectioned microspheres in the transmission electron microscope showed a matrix containing numerous discrete spheroidal air vesicles in the 0.1 to 1.0 μm range. Analysis of the dried microspheres yielded:

Solids density=2.44 g/cc; nitrogen porosity=41 volume %; surface area=176 m²/g; ash=95.6%; SiO$_2$=61.8% of ash; TiO$_2$=38.2% of ash.

EXAMPLES 7–8

These examples illustrate the use of the pigmented microspheres prepared according to the invention in typical emulsion paint systems.

A latex paint masterbatch was prepared by combining 310.6 pounds (140.9 kg.) of a commercially available TiO$_2$ pigment, sold by the Du Pont Company under the name Ti-Pure R-931 and 334.1 pounds (151.5 kg.) of an aqueous emulsion containing 55% by weight of polyvinyl acetate copolymer. The masterbatch contained 3.1 pounds of TiO$_2$ per gallon (0.37 kg./liter) and a pigment volume concentration of 34%.

The test paints were then prepared by stirring into the masterbatch different proportions of the microspheres prepared as described in Example 1 in wetcake form to provide paints having a microsphere volume concentration (MVC) from 24% to 65%, based on the total volume of the test paint. The MVCs for each test paint are shown in Table II.

The microsphere volume concentration (MVC) is determined as follows:

$$MVC = \frac{\text{total volume of microspheres in dry paint film} \times 100}{\text{total volume of dry paint film}}$$

The pH of the masterbatch was adjusted to 8.5 with ammonia before adding the microspheres.

As a control, a conventional emulsion paint was prepared using the same ingredients as in the masterbatch but with added extender.

| Pigment | In 100 Gal. (378.5 liters) of Control Paint |
|---|---|
| TiO$_2$ | 310.6 lb. (140.9 kg.) |
| Silica | 54.8 lb. (24.8 kg.) |
| Calcium Carbonate | 62.1 lb. (28.2 kg.) |
| Vehicle | In 100 Gal. (378.5 liters) of Control Paint |
| 55% polyvinyl acetate polymer | 281.6 lb. (127.7 kg.) |

The control paint thus contained 3.1 lb. TiO$_2$/gal. (0.37 1 kg./liter) and had a pigment volume concentration of 50%.

The paints were drawn down on a Morest chart, a glossy paper chart having black and white areas, with a 0.003 inch (0.0076 cm.) clearance blade. After allowing the drawdowns to dry overnight, reflectance measurements were taken with a Gardner Automatic Multipurpose Reflectometer using a green filter. Scattering coefficients per mil of wet paint were then calculated from the reflectance measurement using a Kebulka-Munk anaylsis. The dry drawdowns were grit-free and had a uniform appearance with very low sheen characteristics. The scattering coefficients for each test paint are shown in Table II.

The stain resistance of the paints was determined by the following method. Side-by-side drawdowns of the control paint and test paint were made on white Morest charts using a 0.006 inch (0.0152 cm.) clearance film applicator. After allowing the drawdowns to dry four days, equal areas of the side-by-side films were covered with an excess of K&N Standard Test Compound, which is a heavy, oil-based ink. After 90 seconds, the ink was wiped off as completely as possible with paper towels. The degree of staining (darkening of the film) was visually determined and the test paint was rated better or worse than the control. A "plus" designation indicates better stain resistance and a "minus" designation indicates worse stain resistance than the control. The degree of staining relative to the control is ranked as one of the following: "equal, very slight, slight, considerable and definite". The stain resistance for each test paint is shown in Table II.

An important benefit of this invention is that due to the high bulking of the microspheres, the addition of microsphere wetcake to the masterbatch substantially increases the final volume of the paint. Conventional opacifying pigments such as $TiO_2$ are relatively dense (low bulking) and contribute little to the paint volume. The effect of MVC on the volume of paint produced is shown in Table II for each test paint. The volume of the masterbatch and control paints are arbitrarily set at 100 units each.

TABLE II

| Test Paint No. | MVC (%) | Scattering Coefficient S, mil$^{-1}$ wet Paint | Stain Resistance Rating | Rel. Volume of Paint |
| --- | --- | --- | --- | --- |
| P-1 (masterbatch) | 0 | 2.41 | — | 100 |
| P-2 | 24 | 2.79 | slight + | 123 |
| P-3 | 35 | 3.37 | v. slight + | 140 |
| P-4 | 46 | 3.89 | v. slight + | 162 |
| P-5 | 56 | 4.30 | equal | 193 |
| P-6 | 60 | 4.23 | equal | 205 |
| P-7 | 65 | 4.21 | v. slight − | 229 |
| P-8 (control) | — | 3.77 | control | 100 |

Table II shows that the hiding power of paints 5 and 6 exceeded that of the control (No. 8) by 13% while maintaining equal stain resistance ratings. In addition, the volumes of these test paints were from 93% to 105% greater than the control because of the bulking effect of the added microspheres. At lower MVC, the opacity of the paint films decreased but stain resistance improved. Thus No. 4 test paint had about the same opacity as the control, but better stain resistance. It was also greater in volume than the control by 62%.

EXAMPLE 8

Test paints were prepared as described in Example 7 using the microspheres (wetcake form) prepared as described in Example 1, except that the amount of $TiO_2$ pigment in these microspheres was 33.5% by weight, based on the total weight of the ash compared to 44.9% by weight for the microspheres used in Example 7.

The properties and microsphere volume concentration of each test paint are shown in Table III.

TABLE III

| Paint No. | BVC (%) | Scattering Coefficient S, mil$^{-1}$ wet Paint | Stain Resistance Rating | Rel. Volume of Paint |
| --- | --- | --- | --- | --- |
| P-9 (masterbatch) | 0 | 2.45 | definite + | 100 |
| P-10 | 17 | 2.51 | considerable + | 119 |
| P-11 | 26 | 2.75 | slight + | 133 |
| P-12 | 35 | 3.14 | slight + | 152 |
| P-13 | 45 | 3.35 | v. slight + | 178 |
| P-14 | 55 | 3.67 | equal | 216 |
| P-15 (control) | — | 3.89 | control | 100 |

Table III shows that the opacity of the masterbatch increased with the addition of microsphere wetcake. Opacity levels were not as high as in paints of Example 7 because of the reduced $TiO_2$ content of these microspheres. At a stain resistance equal to the No. 15 control, test paint No. 14 had just 6% less hiding power. However, the volume of paint No. 14 was twice that of the control.

INDUSTRIAL APPLICABILITY

Although there are a variety of methods available for preparing pigmented microporous silica microspheres, most involve a variety of necessarily separate process steps and the use of water-immiscible organic liquids. The present invention provides a process for preparing the microspheres which is easily capable of commercial scale operation, involves fewer processing steps and eliminates the need for water-immiscible organic liquids and the associated waste disposal problems.

We claim:

1. A process for preparing pigmented microporous silica microspheres by the steps of
    (i) forming an aqueous suspension consisting essentially of particulate inorganic pigment uniformly dispersed in an aqueous solution of an alkali metal silicate,
    (ii) spraying the aqueous suspension of step (i) into air to form fine droplets,
    (iii) contacting the droplets with a medium consisting essentially of from 0% to 80% by volume of water, based on the volume of the medium, and from 20% to 100% by volume of a water miscible organic liquid, based on the volume of the medium, the pH of the medium being maintained at from 2 to 9 throughout the contacting, to form a suspension of pigmented microporous silica microspheres, and
    (iv) isolating the pigmented microporous silica microspheres from the suspension of step (iii).

2. Process according to claim 1 wherein the aqueous suspension of step (i) contains from 10% to 70% by weight of a particulate inorganic pigment.

3. Process according to claim 2 wherein the medium of step (iii) contains from 20% to 60% by volume of a water miscible organic liquid selected from lower aliphatic alcohols, lower aliphatic acids, ketones, glycols, glycol ethers, amines and alcohol amines.

4. Process according to claim 3 wherein the pH of the medium of step (iii) is maintained from 2 to 5 throughout the contacting.

* * * * *